US009991483B2

(12) United States Patent
Lee (10) Patent No.: US 9,991,483 B2
(45) Date of Patent: Jun. 5, 2018

(54) BATTERY PACK (71) Applicant: SAMSUNG SDI CO., LTD., Yongin-si, Gyeonggi-do (KR)

(72) Inventor: Eun-Joong Lee, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 319 days.

(21) Appl. No.: 13/933,216

(22) Filed: Jul. 2, 2013

(65) Prior Publication Data
US 2014/0220388 A1 Aug. 7, 2014

(30) Foreign Application Priority Data

Feb. 5, 2013 (KR) .................. 10-2013-0012950

(51) Int. Cl.
*H01M 2/10* (2006.01)
*H01M 2/02* (2006.01)
*H01M 10/42* (2006.01)

(52) U.S. Cl.
CPC ....... *H01M 2/1022* (2013.01); *H01M 2/0267* (2013.01); *H01M 2/1061* (2013.01);
(Continued)

(58) Field of Classification Search
CPC .......... H01M 2/10; H01M 2/12; H01M 2/425; H01M 10/425; H01M 10/4207; H01M 2/0267; H01M 2/1022; H01M 2/1061; H01M 2/1077; C09J 7/02; C09J 7/0239; C09J 2203/334; B32B 7/045; B32B 7/12; B32B 7/14
See application file for complete search history.

(56) References Cited

U.S. PATENT DOCUMENTS 2,264,628 A * 12/1941 Engert ............... G09F 3/10
118/504
5,707,757 A * 1/1998 Lee .................. 429/86
(Continued)

FOREIGN PATENT DOCUMENTS

EP          2-515-358 A1    10/2012
KR    10-2009-0118197 A    11/2009
(Continued)

OTHER PUBLICATIONS

Office Action mailed in Korean Patent Application No. 10-2013-0012950 dated Jan. 29, 2014.
(Continued)

*Primary Examiner* — Michael L Dignan
(74) *Attorney, Agent, or Firm* — Lee & Morse, P.C.

(57) ABSTRACT

A battery pack including a plurality of battery cells; a protective circuit module electrically connected to the plurality of battery cells, the protective circuit module being for establishing an electrical connection with an external electronic device; a case accommodating the plurality of battery cells and the protective circuit module, the case including a first case and a second case coupled to the first case; an adhesive sheet attached to at least a portion of an outer surface of the case, the adhesive sheet including a base sheet and a bubble prevention part on the base sheet; and a protective cover interposed between the protective circuit module and the adhesive sheet.

17 Claims, 5 Drawing Sheets (52) U.S. Cl.
CPC ....... *H01M 2/1077* (2013.01); *H01M 10/425* (2013.01); *H01M 10/4207* (2013.01)

(56) References Cited

U.S. PATENT DOCUMENTS

| | | | | |
|---|---|---|---|---|
| 6,197,397 | B1* | 3/2001 | Sher | C09J 5/08 |
| | | | | 156/245 |
| 7,799,394 | B2* | 9/2010 | Toms | B32B 3/22 |
| | | | | 428/34.1 |
| 2004/0180195 | A1* | 9/2004 | Macuga | B32B 7/12 |
| | | | | 428/343 |
| 2005/0208345 | A1* | 9/2005 | Yoon et al. | 429/7 |
| 2010/0015374 | A1* | 1/2010 | Fulwiler | B32B 7/12 |
| | | | | 428/36.5 |
| 2010/0075216 | A1 | 3/2010 | Yoo | |
| 2011/0143172 | A1* | 6/2011 | Park | 429/7 |
| 2011/0197435 | A1* | 8/2011 | Kaneko et al. | 29/623.2 |
| 2011/0250408 | A1* | 10/2011 | Kasahara | B43M 5/00 |
| | | | | 428/195.1 |
| 2012/0129027 | A1* | 5/2012 | Hong | H01M 2/1038 |
| | | | | 429/99 |
| 2012/0214024 | A1* | 8/2012 | Moon | H01M 2/1061 |
| | | | | 429/7 |
| 2012/0214025 | A1 | 8/2012 | Moon et al. | |
| 2012/0251856 | A1 | 10/2012 | Kim et al. | |
| 2012/0257349 | A1* | 10/2012 | Bang | H01M 2/1061 |
| | | | | 361/679.55 |
| 2012/0270074 | A1* | 10/2012 | Koh | H01M 2/0212 |
| | | | | 429/7 |

FOREIGN PATENT DOCUMENTS

| | | |
|---|---|---|
| KR | 10-2010-003041 A | 3/2010 |
| KR | 10-2011-0130863 A | 12/2011 |
| KR | 10-2012-0094706 A | 8/2012 |
| KR | 10-2012-0094707 A | 8/2012 |
| KR | 10-2012-0111660 A | 10/2012 |
| KR | 20-0463524 Y1 | 11/2012 |

OTHER PUBLICATIONS

Extended European Search Report dated Apr. 2, 2014 in corresponding European Patent Application No. 13191420.2.
European Examination Report dated Oct. 31, 2016 in corresponding European Patent Application No. 13191420.2; Lee.
First Office Action issued by the Chinese Patent Office dated Apr. 14, 2017 in the examination of the Chinese Patent Application No. 201310466980.X.
Second Office Action issued by the Chinese Patent Office dated Dec. 18, 2017 in the examination of the Chinese Patent Application No. 201310466980.X.

* cited by examiner

BATTERY PACK

CROSS-REFERENCE TO RELATED APPLICATION

Korean Patent Application No. 10-2013-0012950, filed on Feb. 5, 2013, in the Korean Intellectual Property Office, and entitled: "Battery Pack," is incorporated by reference herein in its entirety.

BACKGROUND

1. Field

Embodiments relate to a battery pack.

2. Description of the Related Art

A secondary battery refers to a chargeable and/or dischargeable battery, and may be widely used in small mobile devices (for example, smart phones, ultra slim notebook computers, portable information terminals, camcorders, video cameras, and digital cameras) and medium or large sized electronic devices (for example, electric vehicles, hybrid electric vehicles, electric bicycles, uninterruptible power supplies (UPSs), and energy storage systems (ESSs)).

A small mobile device may include a small number of battery cells. On the other hand, a medium or large sized electronic device may require high power and high capacity. Thus, a medium or large sized electronic device may use a battery pack in which a plurality of battery cells are electrically connected to each other.

SUMMARY

Embodiments are directed to a battery pack.

The embodiments may be realized by providing a battery pack including a plurality of battery cells; a protective circuit module electrically connected to the plurality of battery cells, the protective circuit module being for establishing an electrical connection with an external electronic device; a case accommodating the plurality of battery cells and the protective circuit module, the case including a first case and a second case coupled to the first case; an adhesive sheet attached to at least a portion of an outer surface of the case, the adhesive sheet including a base sheet and a bubble prevention part on the base sheet; and a protective cover interposed between the protective circuit module and the adhesive sheet.

The bubble prevention part may include adhesive layers on one surface of the base sheet; and air discharge paths between the adhesive layers.

The one surface of the base sheet may face the case.

The adhesive sheet may include a first area overlying a first space accommodating the plurality of battery cells, and a second area overlying a second space accommodating the protective circuit module, the bubble prevention part being in the first area.

Only an adhesive layer may be formed in the second area.

The protective cover may be attached to the second area of the adhesive sheet.

The second area may be larger than an area of the protective cover.

The air discharge paths may be in fluid communication with an external surface of the adhesive sheet.

The air discharge paths may be in fluid communication with each other.

The adhesive layers may include an adhesive material, and the air discharge paths may correspond to a concave portion between the adhesive layers.

The adhesive layers may be surrounded by the air discharge paths.

The air discharge paths may have a lattice shaped pattern.

The air discharge paths may be disposed side-by-side in an alternating fashion.

The battery pack may further include an adhesive material between adjacent air discharge paths from among the air discharge paths.

The adhesive sheet may be a label of the battery pack.

The protective cover attached to the adhesive sheet may have an integral structure.

The adhesive sheet may have flexibility.

The protective cover may have rigidity.

The battery pack may further include a hook on the first case; and a hook fastening hole, corresponding to a position of the hook of the first case coupled in one direction, on the second case; wherein the adhesive sheet is attached to the at least a portion of the outer surface of the case.

The protective cover may have an area greater than an area of the protective circuit module.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

The embodiments may be embodied with many different modifications and thus may include several embodiments. Therefore, specific embodiments will be shown in the drawings and described in detail. However, it will be understood by those of ordinary skill in the art that various changes in form and details may be made therein without departing from the spirit and scope of the embodiments as defined by the following claims. Moreover, detailed descriptions related to well-known functions or configurations will be ruled out in order not to unnecessarily obscure subject matters of the embodiments.

Although terms like first and second may be used to describe various components, the components are not limited to these terms. The terms are only used to distinguish one component from another component.

Terms used in this specification are used to describe specific embodiments, and are not intended to limit the scope of the present invention. A singular form used for the terms herein may include a plural form unless being clearly different from the context. In this specification, the meaning of "include," "comprise," "including," or "comprising," specifies a property, a region, a fixed number, a step, a process, an element and/or a component but does not exclude other properties, regions, fixed numbers, steps, processes, elements and/or components.

Hereinafter, embodiments of a battery pack will be described in detail with reference to the accompanying drawings, and like reference numerals refer to like elements. Therefore, repeated or overlapping descriptions may be omitted.

Figure 1:
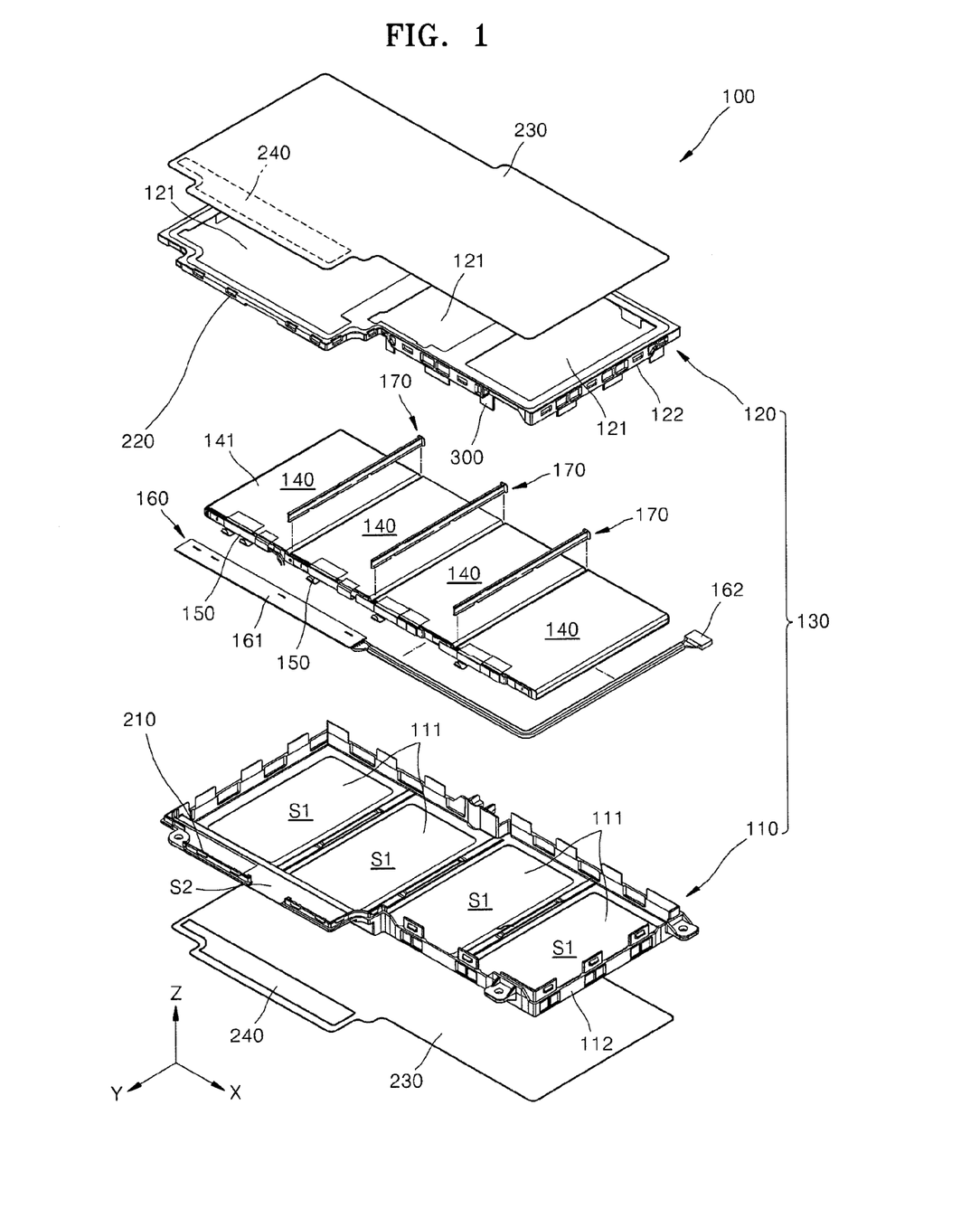
FIG. 1 illustrates an exploded perspective view of a battery pack according to an embodiment.
Figure 2:
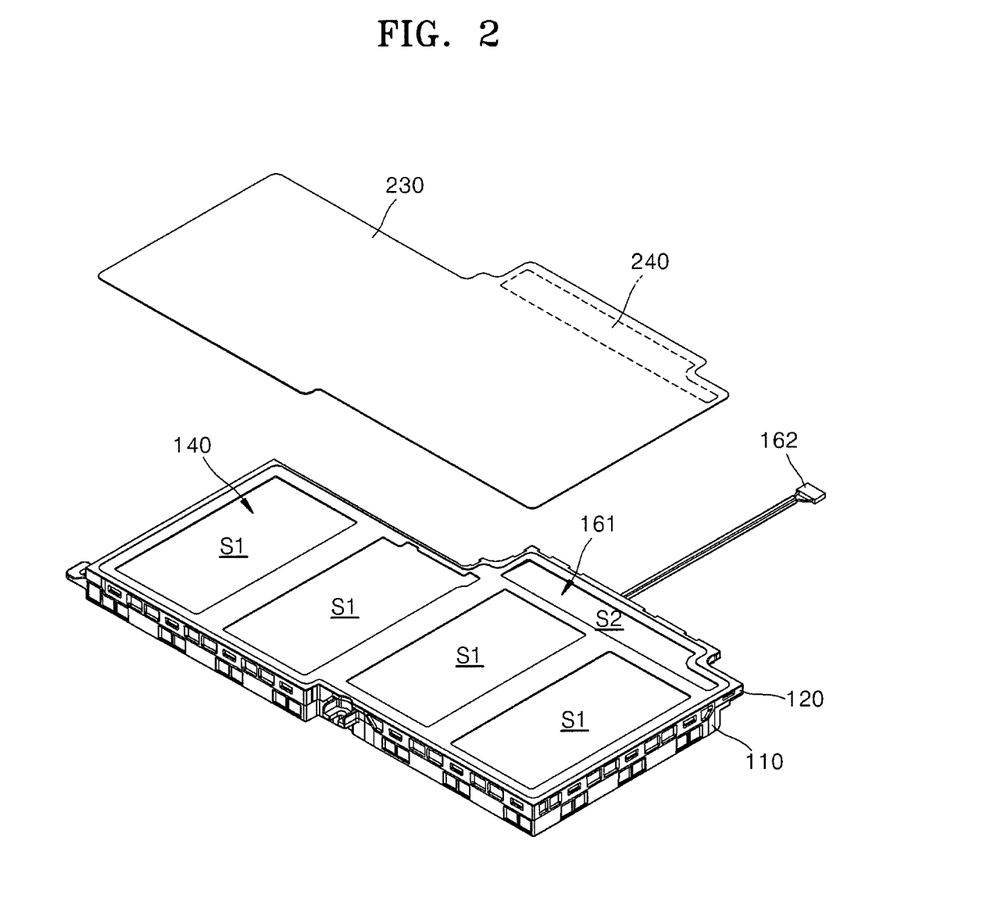
FIG. 2 illustrates a perspective view showing an adhesive sheet and a protective cover separated from the battery pack.
Figure 3:
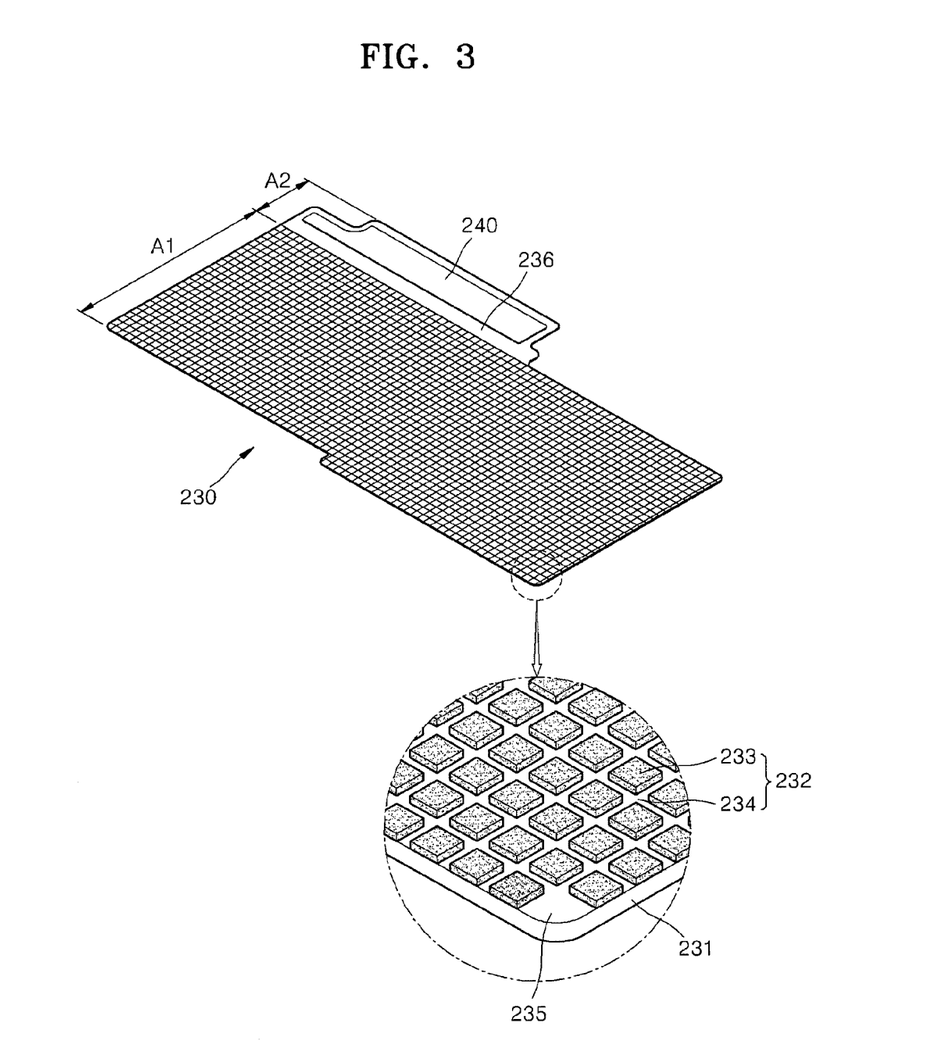
FIG. 3 illustrates a perspective view of an enlarged portion of a surface of the adhesive sheet and the protective cover that faces an interior of the battery pack.
Figure 4:
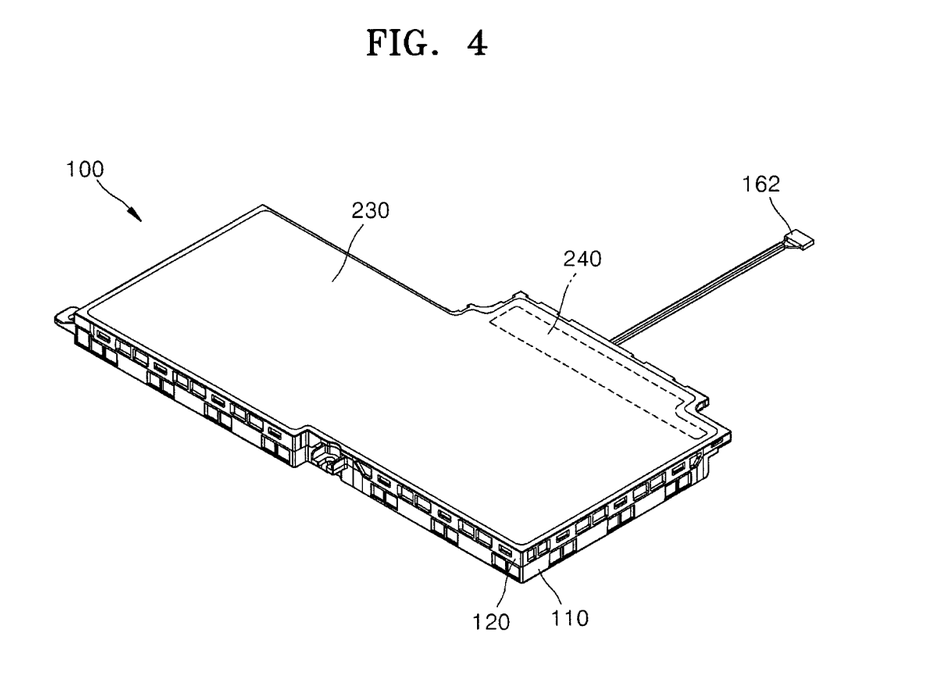
FIG. 4 illustrates a perspective view showing an adhesive sheet and a protective cover attached to the battery pack of FIG. 2.

FIG. 1 illustrates an exploded perspective view of a battery pack 100 according to an embodiment. FIG. 2 illustrates a perspective view showing an adhesive sheet 230 and a protective cover 240 separated from the battery pack 100. FIG. 3 illustrates a perspective view of an enlarged portion of a surface of the adhesive sheet 230 and the protective cover 240 that faces an interior of the battery pack 100. FIG. 4 illustrates a perspective view showing the adhesive sheet 230 and the protective cover 240 attached to the battery pack 100 of FIG. 2.

Referring to FIGS. 1 to 4, the battery pack 100 may include a case 130 (including a first case 110 and a second case 120), a plurality of battery cells 140 (between the first case 110 and the second case 120 and arranged in parallel to each other), and a protective circuit module 160 (electrically connected to the battery cell 140).

The first case 110 and the second case 120 may be coupled to form a first space S1 (for accommodating the plurality of battery cells 140) and a second space S2 (for accommodating the protective circuit module 160).

The first case 110 and the second case 120 may be formed through, e.g., injection molding of an insulating plastic material. The plastic material may include, e.g., polyvinyl chloride (PVC), polystyrene (PS), polypropylene (PP), polycarbonate (PC), or polyimide (PI).

A plurality of first openings 111 may be formed in the first case 110. One surface of the plurality of battery cells 140 may be exposed through the plurality of first openings 111. The first opening 111 may be surrounded by a first frame 112.

A second opening 121 (exposing another surface of the plurality of battery cells 140) may be formed in the second case 120, and may be surrounded by a second frame 122.

The plurality of battery cells 140 may be used to form a lithium-ion battery as a rechargeable secondary battery. The plurality of battery cells 140 may each include a can 141 for accommodating an electrode assembly (not shown). The electrode assembly may be manufactured by stacking a positive plate, a negative plate, and a separator between the positive plate and the negative plate, and winding them in a jelly-roll form.

The can 141 may be formed of a metallic material, and may have a first charge on the surface thereof. For example, the can 141 may be formed of aluminum or an aluminum alloy.

The plurality of battery cells 140 may be disposed side-by-side along one direction, and may be connected in series or parallel by a lead plate 150. In the present embodiment, although four battery cells 140 are shown connected in series to configure one battery pack 100, the embodiments are not limited thereto. The number or connection method of the battery cells 140 configuring the battery pack 100 is not limited, and thus may be variously configured.

The plurality of battery cells 140 may be electrically connected to the protective circuit module 160. The protective circuit module 160 may help prevent overheating or an explosion occurring due to overcharge, overdischarge, or overcurrent of the plurality of battery cells 140 connected in series or parallel.

The protective circuit module 160 may include a circuit substrate 161 (in the second space S2 of the case 130) and a protective device (not shown) mounted on the circuit substrate 161. The protective device may include a safety device and/or an integrated circuit including a passive device such as a resistor and a capacitor and an active device such as an electric field transistor. The protective device may include a positive temperature coefficient (PTC) device. In the present embodiment, although the protective device mounted in the circuit substrate 161 is described, the embodiments are not limited thereto. For example, the protective device may be disposed on the circuit substrate 161 to be exposed.

A connector 162 (for electrically connecting the battery pack 100 to an external electronic device) may be connected to one side of the circuit substrate 161. In an implementation, the connector 162 may include a ground terminal, a temperature terminal, a data terminal, a clock terminal, and/or anode and cathode terminals.

An exterior material of the battery cell 140 may be the can 141 (having a first conductivity), the battery cells 140 disposed side-by-side may need to be insulated from each other. Accordingly, a spacer 170 may be disposed between the adjacent battery cells 140 to prevent a short circuit therebetween.

The spacer 170 may be formed of an insulating material, e.g., plastic, and a length of the spacer 170 may be longer than a length of the battery cell 140.

In an implementation, after the first case 110 and the second case 120 are assembled, e.g., coupled together, the adhesive sheet 230 may be attached to at least a portion of an outer surface of the case 130, and the protective cover 240 (covering the protective circuit module 160) may be attached at one side of the adhesive sheet 230.

For example, the plurality of first openings 111 may be formed in the first case 110. In order to partition the first openings 111, the first frame 112 may be formed along a perimeter of each opening 111.

The plurality of second openings 121 may be formed in the second case 120 (that is coupled with the first case 111). In order to partition the second openings 121, the second frame 122 may be formed along a perimeter of each opening 121.

The first case 110 and the second case 120 may be coupled to each other in one direction (e.g., a vertical or z-axis direction in FIG. 1). A space may be formed inside the coupled first case 110 and second case 120. The space may include the first space S1 for accommodating the battery cell 140 and the second space S2 for accommodating the protective circuit module 160.

A plurality of hooks 210 may be formed on the first frame 112. The hooks 210 may be spaced apart from each other (e.g., along one direction) on the first frame 112. In an implementation, the hooks 210 may be formed both in a width direction and length direction (e.g., x-axis and y-axis directions in FIG. 1) of the first frame 112 along an outer edge of the first case 110. The hook 210 may have a form protruding from an upper edge of the first frame 112 facing the second case 120.

A plurality of hook fastening holes 220 may be formed in the second frame 122. The hook fastening holes 220 may be spaced a predetermined interval apart from each other along a sidewall of the second frame 122. The hook fastening holes 220 may be formed at positions corresponding to or overlying the positions at which hooks 210 are formed when the first case 110 and the second case 110 are coupled to each other in a vertical direction. The number of the hook fastening holes 220 may be identical to the number of the hooks 210. The hook fastening holes 220 may have a size into which the hook 210 may be inserted and coupled. In other words, as will be apparent to a person of ordinary skill in the art from the foregoing description and from the drawings, each hook 210 may be in an interengaging relationship with a corresponding one of the hook fastening holes 220.

A rib 300 may be formed on the second frame 122. The rib 300 may protrude from a lower edge of the second frame 122 toward the second case 120. In an implementation, the rib 300 may protrude from a lower edge of the second frame 122 toward the first frame 112 of the first case 110.

When the first case 110 and the second case 120 are coupled to each other in a vertical (e.g., z-axis) direction, the rib 300 may be coupled with the first frame 112 in an overlapping manner. For example, a space for accommodating the rib 300 may be formed at an inner wall of the first frame 112.

The hooks 210 coupled to (or interengaged with) the hook fastening holes 220 and the ribs 300 may be alternately disposed. For example, the hooks 210 may be spaced at a predetermined interval apart from each other in the first frame 112. The hook fastening holes 220 may be formed at portions that vertically correspond to or overlie the hooks 210 in the second frame 122. The rib 300 may be between the hook fastening holes 220 in the second frame 122.

After the hook 210 of the first case 110 is coupled or interengaged with the hook fastening hole 220 of the second case 120 (to assemble the case 130), the adhesive sheet 230 and the protective cover 240 may be attached to the outer surface of the case 130.

The adhesive sheet 230 may be attached to cover the first space S1 (for accommodating the plurality of battery cells 140) and the second space S2 (for accommodating the protective circuit module 160). For example, the protective cover 240 may be attached to or coupled with the second space S2 (for accommodating the circuit substrate 161 of the protective circuit module 160). In an implementation, the protective cover 240 may be interposed between the circuit substrate 161 and the adhesive sheet 230.

The adhesive sheet 230 may include a base sheet 231. The base sheet 231 may provide durability to the adhesive sheet 230 and may serve as a protective material to help prevent damage to the outer surface of the first space S1 (receiving the battery cell 140 to which the adhesive sheet 230 is attached) and the second space S2 (for accommodating the protective circuit module 160). The base sheet 231 may be formed of a material having high tensile strength and durability.

The base sheet 231 may include a resin material. For example, the base sheet 231 may include a material such as polyolefin including polyethylene and polypropylene, polyester including polyethylene terephthalate and polybutylene terephthalate, polyvinyl chloride, polystyrene, polyurethane, polycarbonate, polyamide, polyimide, polymethylmethacrylate, polybutene, or polybutadiene. In an implementation, the base sheet 231 may include a polymer film having flexibility.

A bubble prevention part 232 may be formed at or on one surface of the base sheet 231, e.g., a surface 235 of the adhesive sheet 230 that faces the case 130. The bubble prevention part 232 may include an adhesive layer 233 (on the surface 235 of the base sheet 231) and an air discharge path 234 (that allows air to move between the adhesive layers 233).

The adhesive layer 233 may include an adhesive material to facilitate attachment of the adhesive sheet 230 to the outer surface of the case 130. For example, the adhesive layer 233 may include acrylic, polyester, polyurethane, rubber, or silicon based materials.

The air discharge path 234 may help prevent air from being trapped or bubbles from occurring between the adhesive sheet 230 and the case 130, when the adhesive sheet 230 is attached to the outer surface of the case 130. The air discharge path 234 may have a concave form, relative to the adhesive layer 233, and may extend to an edge of the base sheet 231 to be in fluid communication with the outside. For example, the air in the adhesive sheet 230 may be discharged to the outside through the air discharge path 234.

The air discharge paths 234 may be in fluid communication with each other, in order to form a network. For example, the air discharge path 234 may form a lattice shaped pattern. The air in the adhesive sheet 230 may be distributed and moved in all directions through the mutually connected air discharge paths 234. Thus, bubble formation in the adhesive sheet may be prevented, so that efficiency of air emission may be improved.

As the air discharge path 234 may be formed with a lattice shaped pattern, the adhesive layer 233 may be surrounded by the air discharge path 234. Additionally, the adhesive layer 233 may be mutually spaced apart from each other, unlike the interconnected air discharge path 234.

In the present embodiment, although the air discharge path 234 having a lattice shaped pattern and the adhesive layer 233 having a roughly rectangular shape are illustrated in the drawing figures, the embodiments are not limited thereto. For example, even when the air discharge paths 234 are in fluid communication with each other, the adhesive layer 233 may have, e.g., a circular, oval, or polygonal form.

In the adhesive sheet 230, the adhesive layer 233 and the air discharge path 234 between the adhesive layers 233 may be formed in a first area A1 (corresponding to the first space S1 for accommodating the plurality of battery cells 140), and no air discharge path 234, i.e., only an adhesive layer 236 without the air discharge path 234, may be formed in a second area A2 corresponding to the second space S2 (for accommodating the protective circuit module 160). Thus, electrostatic charge, generated during an assembly process, may be prevented from flowing into the protective circuit module 160 through the air discharge path 234.

The protective cover 240 (covering the circuit substrate 161 of the protective circuit module 160) may be attached to or coupled with the second space S2 for accommodating the protective circuit module 160. The protective cover 240 may be interposed between the circuit substrate 161 and the second area A2 of the adhesive sheet 230. The protective cover 240 may be larger than the circuit substrate 161, i.e., the protective cover 240 may have an area greater than an area of the circuit substrate 161, to cover the circuit substrate 161 of the protective circuit module 160. The protective cover 240 may be formed of a polymer material having rigidity.

In an implementation, the protective cover 240 may be first attached to the circuit substrate 161 of the protective circuit module 160, and then the adhesive sheet 230 may be attached to the protective cover 240. In another implementation, the protective cover 240 may be attached in advance to the second area A2 of the adhesive sheet 230 to help improve workability during an assembly process of the battery pack 100, so that it may have an integral structure with the adhesive sheet 230.

The second area A2 may be larger than the protective cover 240. The protective circuit module 160 may be vulnerable to electrostatic charge. Accordingly, in order to help prevent electrostatic charge from flowing toward the circuit substrate 161 of the protective circuit module 160 through the air discharge path 234, the second area A2 may be larger than the protective cover 240. There may be no air discharge path 234 between edges of the first area A1 and the second area A2 (corresponding to the perimeter of the protective cover 240). Thus, electrostatic charge may be prevented (in advance) from flowing toward the circuit substrate 161 of the protective circuit module 160 through the air discharge path 234.

Figure 5:
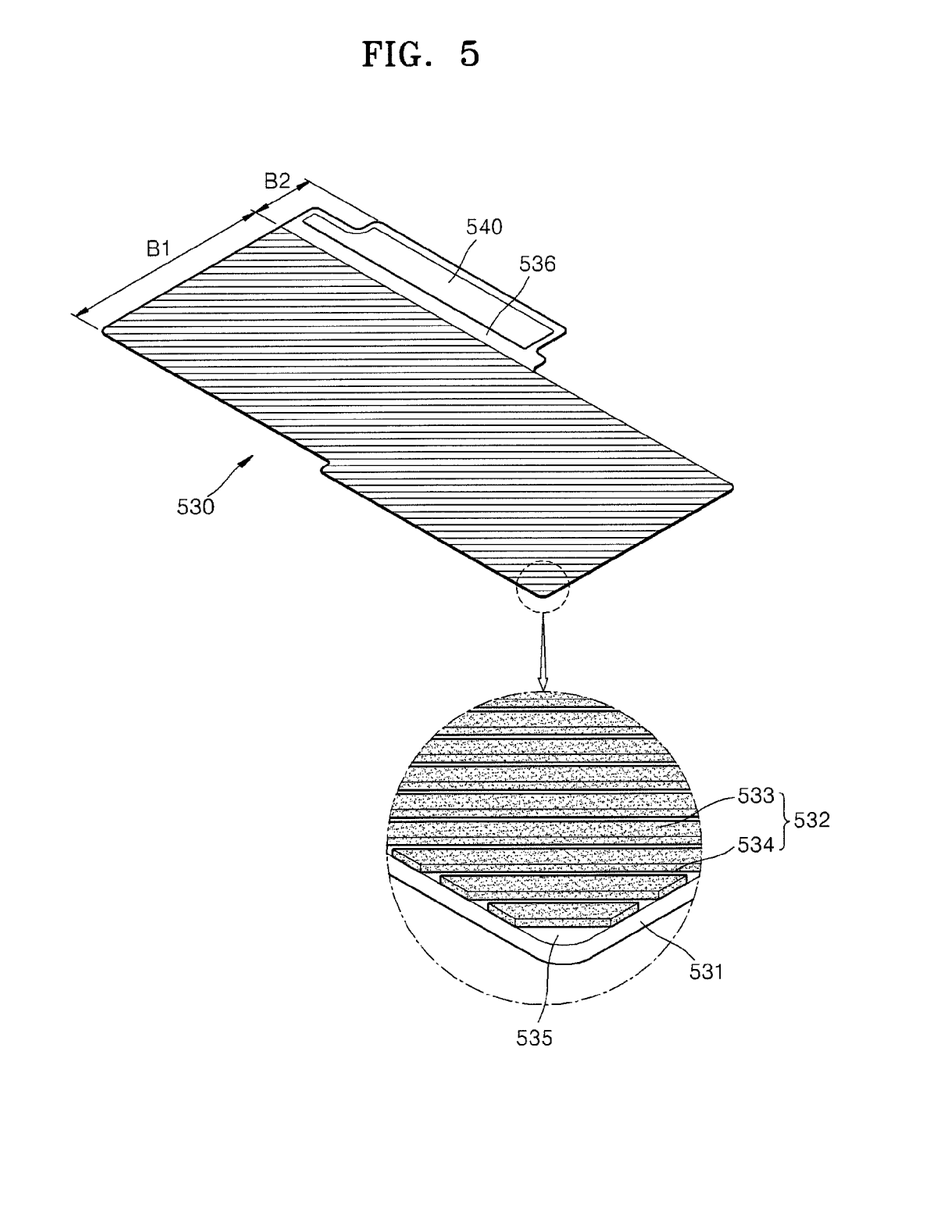
FIG. 5 illustrates a perspective view of an enlarged portion of an adhesive sheet and a protective cover according to another embodiment.

FIG. 5 illustrates a perspective view of an enlarged portion of an adhesive sheet 530 and a protective cover 540 according to another embodiment. Referring to FIG. 5, the adhesive sheet 530 may include a first area B1 corresponding to or overlying the first space S1 (for accommodating the plurality of battery cells 140) of FIG. 1 and a second area B2 corresponding to or overlying the second space S2 (for accommodating the protective circuit module 160) of FIG. 1.

The adhesive sheet 530 may include a base sheet 531 and a bubble prevention part 532 at or on one side 535 of the base sheet 531. The bubble prevention part 532 may be identical to the adhesive sheet 239 described with reference to FIG. 3, in that it includes an adhesive layer 533 and an air discharge path 534.

However, in the present embodiment, there are differences in terms of a formation state or structure of the air discharge path 534 and the form of the adhesive layer 533 according thereto. Hereinafter, these differences will be mainly described.

The adhesive layers 533 may be formed in parallel to each other, e.g., in strips. Accordingly, the air discharge paths 534 between the adhesive layers 533 may be formed in parallel to each other. In the present embodiment, the air discharge path 534 may extend to an edge of the base sheet 531 to be in fluid communication with the outside. The air in the adhesive sheet 530 may be discharged to the outside through the air discharge paths 534 disposed in parallel to each other. Additionally, an adhesive material (not shown) may be further included between the adjacent air discharge paths 534.

In the present embodiment, the air discharge paths 534 may not be mutually connected to each other, e.g., interconnected, in order to allow air to smoothly move along the air discharge path 534. Thus, the adhesive sheet 530 may be sequentially attached to the outer surface of the case 130 of FIG. 1 along an extending direction of the adhesive layer 533.

Moreover, in relation to the adhesive sheet 530, the adhesive layer 533 and the air discharge path 534 between the adhesive layers 533 may be formed in the first area and no air discharge path 534, e.g., only an adhesive layer 536 without the air discharge path 534, may be formed in the second area B2.

The protective cover 540 covering the circuit substrate 161 of the protective circuit module 160 of FIG. 1 may be formed in the second area B2. In an implementation, the protective cover 540 may be larger, e.g., may have a greater area, than the circuit substrate 160. The second area B2 may be larger than the protective cover 540.

Thus, the adhesive sheets 230 and 530 may be provided at the outermost layer of the case 130 and may be used as a label of the battery pack 100. While the protective covers 240 and 540 may be integrally attached to the second areas A2 and B2 of the adhesive sheets 230 and 530, the protective covers 240 and 540 may be attached to the protective circuit module 160, so as to protect the protective circuit module 160.

Manufacturing processes of the battery pack 100 having the above structure will be described with reference to FIGS. 1 to 4.

First, the battery cell 140 may be disposed in the first space S1, and the protective circuit module 160 may be disposed in the second space S2. Then, the first case 110 and the second case 120 may be coupled to each other. When the first case 110 and the second case 120 are coupled to each other, the hook 210 may coupled or interengaged with the hook fastening hole 220, so that they are no longer separated from each other, e.g., are coupled together.

Then, the adhesive sheet 230 and protective cover 240 (having an integral structure) may be attached to or coupled with the outer surface of the case 130.

The first area A1 of the adhesive sheet 230 may be attached to or coupled with the first space S1 (for accommodating the battery cell 140). In an implementation, the protective cover 240 may be first attached to or coupled with the second space S2 (for accommodating the protective circuit module 160), and then the second area A2 of the adhesive sheet 230 may be attached to or coupled with the second space S2.

The protective cover 240 (attached to the second area A2 of the adhesive sheet 230) may have an integrated structure. For example, the integral structure may be completed or formed through one process. Thus, workability may be improved.

Additionally, air between the adhesive sheet 230 and the battery cell 140 may be discharged to the outside through the air discharge path 234 in the adhesive sheet 230. Thus, bubbles may not occur between the adhesive sheet 230 and the battery cell 140.

By way of summation and review, a secondary battery may be classified into a hard pack and an inner pack according to a form in which the secondary battery is mounted on a case. A battery pack may include a case for accommodating a battery cell and an insulating sheet attached onto an exterior of the case. In relation to this, the battery pack should have a structure whereby the insulating sheet is easily attached.

The embodiments provide a battery pack in which bubble and electrostatic generation are reduced and/or prevented.

According to an embodiment, a bubble prevention part may be formed in an adhesive sheet. Thus, generation of bubbles may be prevented in advance.

Additionally, generation of electrostatic charge may be prevented through a protective circuit module.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery pack, comprising:
    a plurality of battery cells;
    a protective circuit module electrically connected to the plurality of battery cells, the protective circuit module being for establishing an electrical connection with an external electronic device;
    a case accommodating the plurality of battery cells and the protective circuit module, the case including a first case and a second case coupled to the first in a vertical direction to form a space for accommodating the plurality of battery cells, such that a surface of each of the first and second cases continuously overlaps all the plurality of battery cells and the protective circuit module;
    an adhesive sheet attached to at least a portion of an outer surface of the first case, the adhesive sheet including a base sheet and a bubble prevention part on the base sheet; and
    a protective cover formed of a material having rigidity interposed between the protective circuit module and the adhesive sheet, wherein;
    the bubble prevention part includes:
        adhesive layers on one surface of the base sheet that faces the case; and
        air discharge paths between the adhesive layers,
    the adhesive sheet includes:
        a first area overlying a first space accommodating the plurality of battery cells, such that the first area of the adhesive sheet includes the bubble prevention part overlying the battery cells, and
        a second area at one side of the first area and continuous and substantially coplanar with the first area, the second area overlying a second space accommodating the protective circuit module, such that the second area of the adhesive sheet includes only an adhesive layer overlying the protective circuit module and does not include the bubble prevention part, and
    the protective cover is attached to the one surface of the base sheet in the second area of the adhesive sheet that includes only the adhesive layer without the bubble prevention part, such that the protective cover overlaps only the adhesive layer and is spaced apart from the bubble prevention part.

2. The battery pack as claimed in claim 1, wherein the second area of the adhesive sheet that includes only the adhesive layer is larger than an area of the protective cover, such that the adhesive layer of the adhesive sheet extends continuously beyond the protective cover.

3. The battery pack as claimed in claim 1, wherein the air discharge paths are in fluid communication with an external surface of the adhesive sheet.

4. The battery pack as claimed in claim 3, wherein the air discharge paths are in fluid communication with each other.

5. The battery pack as claimed in claim 1, wherein:
    the adhesive layers include an adhesive material, and
    the air discharge paths correspond to a concave portion between the adhesive layers.

6. The battery pack as claimed in claim 5, wherein the adhesive layers are surrounded by the air discharge paths.

7. The battery pack as claimed in claim 6, wherein the air discharge paths have a lattice shaped pattern.

8. The battery pack as claimed in claim 1, wherein the air discharge paths are disposed side-by-side in an alternating fashion.

9. The battery pack as claimed in claim 8, further comprising an adhesive material between adjacent air discharge paths from among the air discharge paths.

10. The battery pack as claimed in claim 1, wherein the adhesive sheet is a label of the battery pack.

11. The battery pack as claimed in claim 1, wherein the protective cover attached to the adhesive sheet has an integral structure.

12. The battery pack as claimed in claim 1, wherein the adhesive sheet has flexibility.

13. The battery pack as claimed in claim 1, further comprising:
    a hook on the first case; and
    a hook fastening hole, corresponding to a position of the hook of the first case coupled in one direction, on the second case,
    wherein the adhesive sheet is attached to the outer surface of the first case.

14. The battery pack as claimed in claim 1, wherein the protective cover has an area greater than an area of the protective circuit module.

15. The battery pack as claimed in claim 1, wherein a portion of the first case is between the protective cover and the protective circuit module.

16. The battery pack as claimed in claim 1, wherein the second area of the adhesive sheet is only at a side that includes the protective circuit module.

17. The battery pack as claimed in claim 2, wherein the adhesive layer of the adhesive sheet extends continuously beyond the protective cover around an entire perimeter of the protective cover.

* * * * *